L. G. LANGSTAFF.
LIQUID DISPENSING VESSEL.
APPLICATION FILED JULY 18, 1908.
925,001.
Patented June 15, 1909.
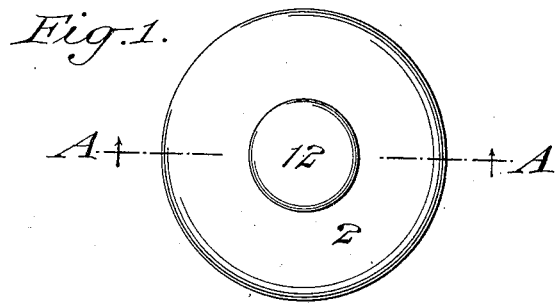
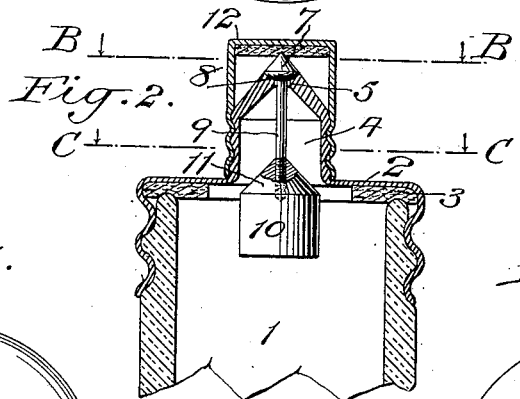
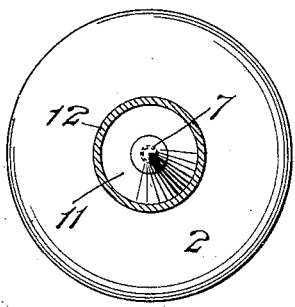
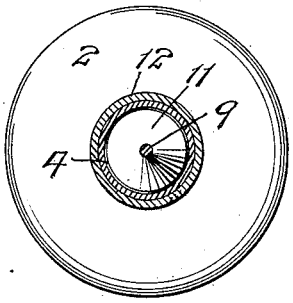
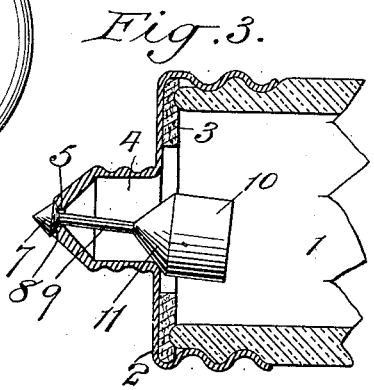
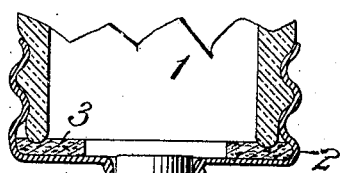
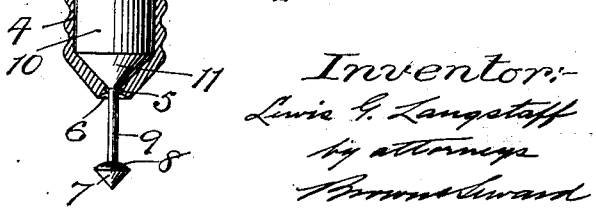

UNITED STATES PATENT OFFICE.

LEWIS G. LANGSTAFF, OF NEW YORK, N. Y.

LIQUID-DISPENSING VESSEL.

No. 925,001.  Specification of Letters Patent.  Patented June 15, 1909.

Application filed July 18, 1908. Serial No. 444,257.

*To all whom it may concern:*

Be it known that I, LEWIS G. LANGSTAFF, a citizen of the United States, and resident of the borough of Brooklyn, in the city and State of New York, have invented a new and useful Improvement in Liquid-Dispensing Vessels, of which the following is a specification.

The object of this invention is to provide certain improvements in liquid dispensing vessels whereby a predetermined amount of liquid may be ejected from a vessel by inverting the vessel to a predetermined extent, means being employed for automatically preventing the escape of the liquid when the bottle is in all other positions.

A further object is to provide a portable vessel which may be safely carried around with other personal effects without danger of the liquid being allowed to escape from the vessel.

A practical embodiment of my invention is represented in the accompanying drawings, in which—

Figure 1 represents the vessel in top plan, Fig. 2 is a partial vertical central section taken in the plane of the line A—A of Fig. 1, looking in the direction of the arrows, the parts being shown in the positions which they assume when the vessel is in an upright position and the valve retaining cap is in position, Fig. 3 is a similar section with the valve retaining cap removed and the parts in the position which they assume when the vessel is in a horizontal position, the valve being shown held onto its seat by the weighted plunger, Fig. 4 is a view similar to Fig. 3, with the parts in the position which they assume when the bottle is completely inverted, Fig. 5 is a transverse section taken in the plane of the line B—B of Fig. 2, looking in the direction of the arrows, and Fig. 6 is a transverse section taken in the plane of the line C—C of Fig. 2, looking in the direction of the arrows.

The liquid dispensing vessel 1 may be made in any shape and size and of any desired material. This vessel is provided with a removable top 2 which is shown engaged with the vessel in the present instance by having a screw threaded engagement therewith. A suitable washer 3 may be interposed between the top 2 and the mouth of the vessel 1 to prevent the escape of the liquid at this point. This top 2 is provided with a liquid dispensing chamber 4 of the desired size, which chamber is provided with a discharge port 5 having a spherical valve seat 6.

The valve for opening and closing the discharge port 5 is denoted by 7 and it is provided with a spherical face 8 fitted to the spherical seat 6.

A valve stem 9 extends through the port 5 into the dispensing chamber 4 and is there secured to a weighted plunger 10, which conforms in cross section to the chamber 4 and is arranged to slide freely within the same. This weighted plunger is provided with a tapered portion 11 arranged to engage the mouth of the dispensing chamber 4 when the vessel is tilted to any position other than the one which insures the discharge of the liquid. This engagement of the weighted plunger with the mouth of the dispensing vessel will serve to hold the valve onto its seat until the vessel has been inverted to a predetermined extent.

A stem 9 of the valve is considerably smaller in cross section than the cross sectional area of the discharge port 5 so as to permit not only a free discharge of the liquid past the stem when the valve is open but also will permit a swinging movement of the weighted plunger for permitting the engagement of its tapered portion 11 with the mouth of the dispensing chamber 4 irrespective of the position of the vessel except when in the desired position for discharging the liquid.

The spherical contact between the valve and the valve seat serves to maintain a liquid tight closure of the port 5 in whatever position the vessel is placed other than its desired position for discharging the liquid.

If so desired, the top 2 may be provided with a removable valve retaining cap 12 arranged to engage the valve 7 when in position for absolutely locking the valve in its closed position when the vessel is not in use. This cap 12 may be removably secured to the top 2 by having a screw threaded engagement therewith.

When the vessel is inverted into the desired position for discharging the liquid, the weight of the plunger will cause it to drop by gravity into the dispensing chamber 4 and positively eject the liquid therein out through the port 5 and at the same time prevent the escape of any more liquid until the weighted plunger has been again removed from the dispensing chamber.

It is evident that various changes might be resorted to in the construction, form and arrangement of the several parts without departing from the spirit and scope of my invention; hence I do not wish to limit myself strictly to the exact construction herein set forth, but

What I claim is:—

1. A vessel having a liquid dispensing chamber and a discharge port therefor, a valve for said port and a weighted plunger connected to the valve for positively ejecting liquid from the dispensing chamber when the vessel is inverted to a predetermined extent.

2. A vessel having a liquid dispensing chamber therein and a discharge port therefor, a valve for said port and a weighted plunger connected to the valve for positively ejecting the liquid from the dispensing chamber when the vessel is inverted to a predetermined extent, said plunger being constructed to normally hold the valve onto its seat when the vessel is in all other positions.

3. A vessel having a liquid dispensing chamber and a discharge port therefor, a valve for said port and a weighted plunger connected to the valve for positively ejecting the liquid from the dispensing chamber when the vessel is inverted to a predetermined extent, said plunger being provided with a tapered portion arranged to coact with the mouth of the dispensing chamber to normally hold the valve onto its seat when the vessel is in all other positions.

4. A vessel having a liquid dispensing chamber and a discharge port therefor, a valve for said port, a weighted plunger connected to the valve for positively ejecting the liquid from the dispensing chamber when the vessel is inverted to a predetermined extent, and a removable cap for holding the valve onto its seat when the vessel is not in use.

In testimony, that I claim the foregoing as my invention, I have signed my name in presence of two witnesses, this tenth day of July, 1908.

LEWIS G. LANGSTAFF.

Witnesses:
F. GEORGE BARRY,
HENRY THIEME.